Feb. 15, 1927.
W. HERZIK
TRACTOR PLOW
Filed May 11, 1926
1,618,084
2 Sheets-Sheet 2
Fig. 2.
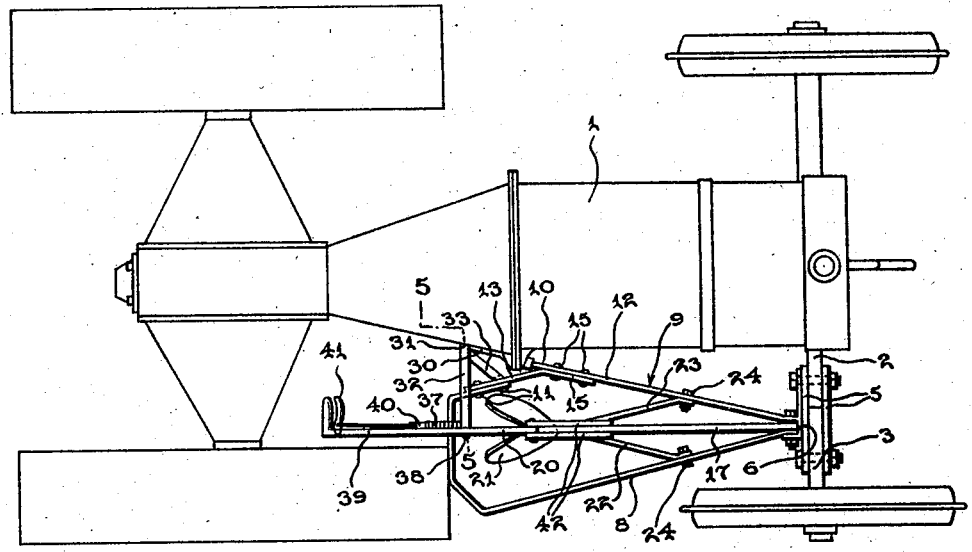
Fig. 3.
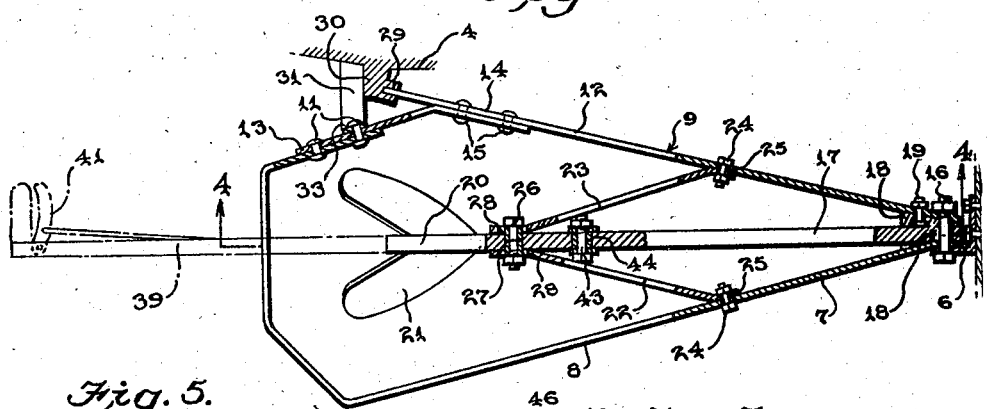
Fig. 5.
Fig. 7.
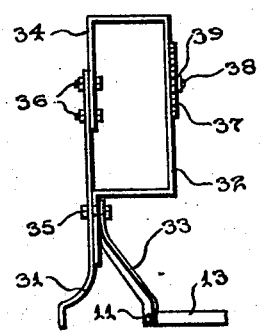
Inventor
William Herzik
By
Attorney Patented Feb. 15, 1927.

1,618,084

UNITED STATES PATENT OFFICE.

WILLIAM HERZIK, OF SCHULENBURG, TEXAS.

TRACTOR PLOW.

Application filed May 11, 1926. Serial No. 108,286.

It is a purpose of the present invention to provide, in a tractor plow, a construction for the tractor consisting of an extension especially for the front axle, rendering a suitable support for a plow applicable to the tractor and including means whereby the plow may be raised and lowered according to the inequalities of the surface of the soil, the extension being such as to hold the frame of the plow in proper position, the frame being such as to accommodate the plow beam substantially in a central position of the frame.

Another purpose is to provide means on the frame and connecting with the plow beam to insure holding the plow beam in position and yet permit it to be raised and lowered. This retaining means also permits of freedom of movement of the plow beam when lifted and lowered and the mounting of the beam at one end includes devices to prevent lateral movement of the beam.

A further purpose is the provision of a frame for the support of the plow beam arranged and constructed and braced relative to the tractor frame and the axle to insure rigidity and thereby constitute a frame support for the plow beam.

The invention comprises further features and combinations of parts to be hereinafter set forth, shown in the drawings and claimed.

In the drawings:

Figure 2 is a top plan view of the structure of Figure 1.

Figure 3 is a detail sectional view on the plane indicated by the line 3—3 of Figure 1.

Figure 4 is a longitudinal sectional view on the plane indicated by the line 4—4 of Figure 3.

Figure 5 is a detail elevational view of the frame supporting the plow carrying beam adjusting means.

Figure 6 is a detail elevational view of a portion of the plow carrying beam and connecting links.

Figure 7 is a detail sectional view on the plane indicated by the line 7—7 of Figure 4.

Figure 1:
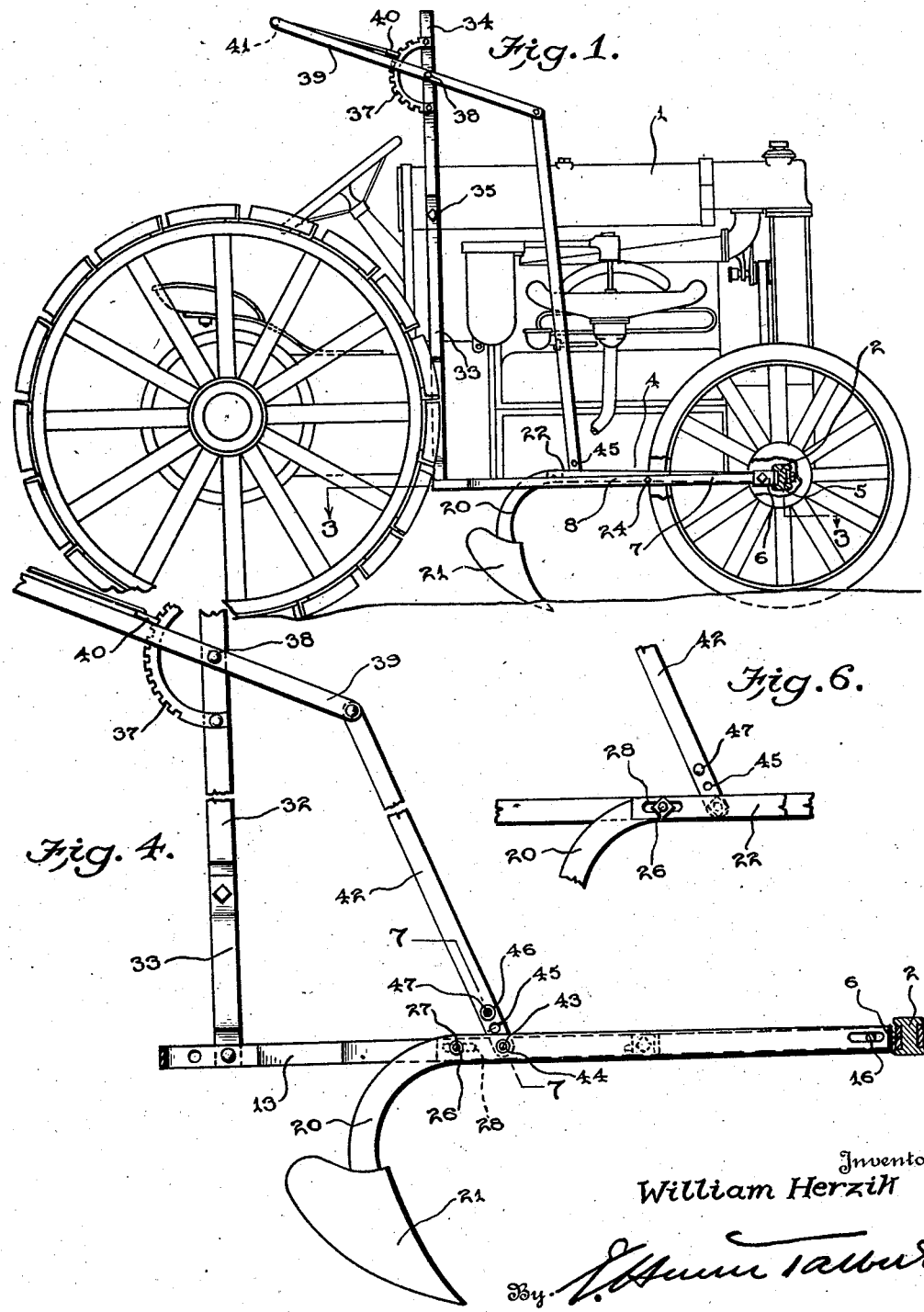
Figure 1 is a side elevational view of a tractor showing the invention applied in operative position thereon.

Referring to the drawings, 1 designates the tractor which may be any design, preferably of the Fordson type, and 2 denotes the front axle, 3 an extension thereof and 4 the tractor frame. The axle extension 3 is connected to the axle 2 by means of the clamps 5 and carried by and connected to the clamps is a brace 6 which supports the forward tapered end of the plow frame 7. The plow frame is of a general triangular formation consisting of the bars 8 and 9 which converge toward each other, as shown. The rear ends of the bars 8 and 9 are of angular form and their extremities 10 overlap and are secured together by bolts 11. The bar 9, however, consist of two parts 12 and 13 which overlap, as shown at 14, and are secured together by bolts 15.

The converged ends of the two bars 8 and 9 are fastened by means of a bolt 16 having a nut, the bolt passing through the brace 6 and the end of the plow beam 17. The extremity of the plow beam 17 has an elongated slot through which the bolt 16 passes, allowing requisite freedom of movement of the plow beam when being raised and lowered. A wedge or filler 18 is fitted between the extremity of the plow beam and the extremity of the bar 9 and the bolt 16 which passes through it.

An extra bolt 19, however, is employed, passing through the bar 9 and through the large end of the wedge with a nut countersunk in one face of the wedge, securing the wedge to the bar. The purpose of this wedge is to prevent the plow beam from moving laterally, in fact, to keep the plow beam squarely in position and yet due to the elongated slot in the end of the beam 17, the beam has freedom of movement in a vertical direction, that is to say, pivotally. In moving pivotally in a vertical direction, the slot in the end of the beam allows the beam to have a slight longitudinal movement and due to the provision of the wedge secured to the bar 9, a space is provided between the wedge and the bar 8 to insure a slight longitudinal movement of the plow beam 17, said space having parallel walls.

The rear of the plow beam curves downwardly and forwardly at its lower end, thereby constituting a plow standard 20 which carries a plow 21. Braces 22 and 23 are provided, their forward lateral ends being secured by bolts 24 to the bars 8 and 9, said bolts passing through bushings 25 and having nuts to hold the parts in position. The braces 22 and 23 extend rearwardly convergently and are secured by a bolt 26. The bolt 26 passes through a bushing 27 and is provided with a nut to hold the parts in position, it being obvious that the bushing passes through elongated slots 28 formed in the convergent ends of the braces. The slots 28 are provided for the purpose of permitting play of the braces and play of the plow beam during the raising and lowering movements of the beam.

It is to be noted that the rear end of the part 12 of the bar 9 is secured at 29 to a suitable brace 30 carried by the tractor frame 4, and rising from the brace 30 and connected thereto is a leg 31 of a frame 32, the leg and thereby the frame 32 being reinforced by an angularly disposed brace 33. The lower end of this brace 33 is connected to the rear portion of the frame 7 by one of the bolts 11. The frame 32 comprises two sections, the frame section 34 and the leg section 31, said leg section overlapping the two ends of the frame section 34 and being secured to them by bolts 35 and 36.

Mounted upon the frame 32 is a rack quadrant 37 and fulcrumed on said frame, as at 38, is a suitable lever 39 provided with a dog 40 for cooperation with the teeth of the quadrant to hold the lever in different positions. A suitable hand grip 41 is carried by the lever and operatively connected to the dog, whereby the dog may be manually disengaged from the teeth of the quadrant, allowing the lever to be adjusted.

As previously stated, the frame 32 assumes a vertical position, being mounted upon the plow frame and on the brace 30, therefore the lever may oscillate vertically on a horizontal axis.

Correspondingly shaped links or connecting bars 42 are provided and have certain of their ends pivotally connected by a bolt 43 (which is provided with a bushing 44) to the plow beam. The other ends of the connecting bars or links 42 have several apertures or openings 45, any two opposite ones of which receive a bushing 46 through which a bolt 47 passes, the bolt and its nut acting to adjustably connect the links or connecting bars 42 to the forward end of the lever 39.

Obviously, the plow frame is mounted so as to assume a position laterally of the tractor frame, the operating lever 39 being in position relative to the operator of the tractor, whereby the plow may be raised and lowered at will to not only regulate the depth of the plow but also enable the plow to be raised in order to pass over any obstructions which may be in its path.

The invention having been set forth, what is claimed is:

1. The combination with a tractor frame including a front axle, of a plow frame connected at its forward end to the axle and secured at its rear end to the tractor frame, a plow carrying beam having a pivotal connection at its forward end with the forward end of the plow frame and extending rearwardly of the latter, and adjusting means mounted at the rear end of the plow frame and connected with the plow carrying beam for raising and lowering the same.

2. In a tractor plow, the combination with a tractor frame and its front axle, the latter having an axle extension, of a plow frame rigidly secured to the tractor frame at its rear side portion and at its forward end to the axle, a plow beam positioned within the frame with its forward end pivotally mounted for vertical pivotal movements within the forward end of the plow frame, a filler to prevent lateral movement of the plow beam, rearwardly converging braces pivotally connected to the sides of the plow frame and their rearwardly converging ends loosely pivoted to the plow beam, and means for raising and lowering the plow beam.

3. The combination with a tractor frame including a front axle and an extension axially connected to the axle, of a plow frame of triangular formation with one of its rear side portions fastened to the tractor frame and its forward end fastened to the axle where the extension unites therewith, a plow carrying beam fulcrumed at its forward end in the plow frame, said plow beam extending rearwardly and located approximately centrally of the plow frame, a filler to prevent lateral play of the plow beam, and means for raising and lowering the plow carrying beam.

4. The combination with a tractor frame including a front axle, of a plow frame of triangular formation with its forward apex fixed to the axle and the rear portion of one of its sides fixed to the tractor frame, a plow beam positioned within the plow frame centrally thereof, means for pivoting the plow beam to the apex end of the plow frame and including means to permit of a slight longitudinal movement of the beam, oscillating braces pivotally connected to the rear portion of the plow beam and diverging forwardly and pivotally connected to the sides of the plow frame, and means for raising and lowering the plow beam.

5. The combination with a tractor frame including a front axle, of a plow frame of triangular formation with its forward apex fixed to the axle and the rear portion of one of its sides fixed to the tractor frame, a plow beam positioned within the plow frame centrally thereof, means for pivoting the plow beam to the apex end of the plow frame and including means to permit of a slight longitudinal movement of the beam, oscillating braces pivotally connected to the rear portion of the plow beam and diverging forwardly and pivotally connected to the sides of the plow frame, means for raising and lowering the plow beam, and a filler to prevent lateral play of the plow beam and thereby relieve excessive lateral strain on the braces.

In testimony whereof he affixes his signature.

WILLIAM HERZIK.